United States Patent
Liu

(10) Patent No.: US 7,577,205 B1
(45) Date of Patent: Aug. 18, 2009

(54) RETURN-LOSS COMPLIANT DSL MODEM LINE INTERFACE UNIT WITH COMPLEX TERMINATION

(75) Inventor: Dongtai Liu, Fremont, CA (US)

(73) Assignee: Ikanos Communications, Inc., Fremont, CA (US)

( * ) Notice: Subject to any disclaimer, the term of this patent is extended or adjusted under 35 U.S.C. 154(b) by 1140 days.

(21) Appl. No.: 10/804,704

(22) Filed: Mar. 19, 2004

Related U.S. Application Data

(60) Provisional application No. 60/544,575, filed on Feb. 13, 2004.

(51) Int. Cl.
*H04B 3/00* (2006.01)
(52) U.S. Cl. ...................................................... 375/258
(58) Field of Classification Search ................. 375/222, 375/258; 379/345, 394, 398; 327/110, 139, 327/177, 561
See application file for complete search history.

(56) References Cited

U.S. PATENT DOCUMENTS

| | | | | |
|---|---|---|---|---|
| 4,538,032 A | * | 8/1985 | Ballatore et al. ............ 379/398 |
| 5,402,485 A | * | 3/1995 | Takato et al. ................ 379/402 |
| 6,100,717 A | * | 8/2000 | May ............................ 326/83 |
| 6,760,434 B1 | | 7/2004 | Rezvani et al. |
| 6,801,621 B1 | | 10/2004 | Tennen |
| 6,925,172 B2 | | 8/2005 | Sabouri et al. |
| 6,970,515 B1 | | 11/2005 | Bicakci |
| 2004/0001586 A1 | * | 1/2004 | Melsa et al. ........... 379/399.01 |

* cited by examiner

*Primary Examiner*—David C Payne
*Assistant Examiner*—Rahel Guarino
(74) *Attorney, Agent, or Firm*—IP Creators; Charles C Cary

(57) ABSTRACT

A DSL line interface includes an impedance synthesizer that provides negative feedback to the differential amplifier in the DSL line interface so that the return loss standards for the return signal are met. The DSL line interface unit comprises a differential line driver including a first amplifier and a second amplifier for amplifying the DSL transmit signal, first and second complex termination modules coupled to the outputs of the first and second amplifiers, a transformer including a primary winding coupled to the transmission line and a secondary winding coupled to the first and second complex termination modules, and an impedance synthesizer module coupled between the secondary winding of the transformer and the first and second amplifiers to provide negative feedback to the first and second amplifiers.

2 Claims, 6 Drawing Sheets

RETURN-LOSS COMPLIANT DSL MODEM LINE INTERFACE UNIT WITH COMPLEX TERMINATION

CROSS-REFERENCE TO RELATED APPLICATION

This application claims priority under 35 U.S.C. §119(e) from co-pending U.S. Provisional Patent Application No. 60/544,575 entitled "Return-Loss Compliant DSL Modem Hybrid With Complex Termination," filed on Feb. 13, 2004, the subject matter of which is incorporated by reference herein in its entirety.

TECHNICAL FIELD

The present invention relates generally to DSL (Digital Subscriber Line) technology, and more specifically, to a DSL modem line interface unit (also known as a DSL modem hybrid) with complex termination that complies with the return-loss requirements standards.

BACKGROUND OF THE INVENTION

Broadband Internet service using DSL technology is becoming more and more popular among Internet users. DSL technology is used for broadband Internet connections from a telephone switching station to a home or office. DSL technology uses DSL modems on both the Central Office (CO) (telephone switching station) and the Customer Premises Equipment (CP) side to modulate data to be transmitted on existing copper wires (transmission line) of a Public Switched Telephone Network (PSTN) and also demodulate data received from the transmission line.

FIG. 1 is a diagram illustrating a conventional DSL line interface unit 100. The DSL line interface unit 100 couples a DSL modem (not shown) on the CO side to a transmission line (also known as "twisted pair") 101 on the CP side. The DSL line interface unit 100 includes a differential line driver including amplifiers 102, 104, resistors 106, 108 each with a resistance of RL, and a transformer (T1) 110.

DSL technology utilizes a full duplex system, i.e., data are transmitted and received on the same transmission line 101. The differential line driver 102, 104 amplifies the transmit signal 112 from the DSL modem (not shown) on the CO side to drive the transmit signal 112 on the transmission line 101. The transformer 110 electrically isolates the CO side from the CP side so that a high voltage on either of the CO and CP sides does not destroy the other side. The DSL line interface unit 100 also receives a receive signal 114 from the CP side.

The transmit signal 112 is amplified by the differential line driver 102, 104 and is applied to the transmission line 101 via a pair of "load resistors" 106, 108. The load resistors 106, 108 serve at least two functions: (i) they provide an impedance for the receive signal 114 to develop a signal voltage (the input impedance for the return signal 114 would be zero without the load resistors 106, 108); and (ii) they match the hybrid input impedance seen by the receive signal 114 to the line impedance of the transmission line 101 for compliance with return loss standards in many countries. Return loss is defined as the logarithm of the ratio of the amplitude of the reflected signal to the amplitude of the incident signal. It is a measure of impedance matching between a receiver and a transmission line. A perfectly matched receiver has a return loss of negative infinity. The typical line impedance of the transmission line 101 is approximately 100 ohm, and thus the resistance of each of the load resistors 106, 108 is typically set at 50 ohm in the conventional DSL line interface unit 100 to match the line impedance of the transmission line 101. The input impedance for the receive signal 114 should be approximately 100 ohm to meet the return loss standards in many countries, where the return loss is regulated to be −10 dB or lower.

FIG. 2 is a diagram illustrating the return loss 200 for the receipt signal 114 in the conventional DSL line interface unit 100 of FIG. 1. It is shown that the return loss 200 is less than −10 dB over practically all frequencies, thus meeting the return loss standards of many countries.

Referring back to FIG. 1, the load resistors 106, 108, however, consume power during signal transmission, and thus increase the power consumption in the DSL line interface unit 100. As much as 50% of the output power of the line driver 102, 104 may be wasted on the load resistors 106, 108.

FIG. 3 is a diagram illustrating another conventional DSL line interface unit 200 with a "complex termination" scheme. In order to reduce the power consumption in the DSL line interface unit 200, conventional techniques use a "complex termination" scheme in which an R-C (resistor-capacitor) network or an L-C (inductor-capacitor) network comprised of a resistor and a capacitor coupled to each other in parallel or an inductor and a capacitor coupled to each other in parallel replaces the load resistors 106, 108 in the DSL line interface unit 100 of FIG. 1. An R-C network or an L-C network may be used in the complex termination, depending upon the frequency range of the transmit signal 112. For example, the DSL line interface unit 200 of FIG. 2 is identical to the DSL line interface unit 100 of FIG. 1, except that complex termination modules 302, 304 are used in place of the load resistors 106, 108. The complex termination modules 302 includes a resistor 106 and a capacitor 306 coupled to each other in parallel, and the complex termination module 304 includes a resistor 108 and a capacitor 308 coupled to each other in parallel. The term "complex termination" herein refers to a pair of a resistor and a capacitor coupled to each other in parallel or a pair of an inductor and a capacitor coupled to each either in parallel, positioned at the output of either one of the amplifiers of a differential amplifier in a DSL line interface unit.

The transmit signal 112 is typically comprised of high frequency signals, and the receive signal 114 is typically comprised of lower frequency signals compared with the transmit signal 112. Thus, the transmit signal 112 primarily passes through the capacitors 306, 308 with little dissipation on the resistors 106, 108, because the capacitors 306, 308 provide low impedance to high frequency signals. The majority of the transmit power flows thru the capacitors 306, 308 (or the inductor in the case of an L-C complex termination) of the complex termination module 302, 304 without being dissipated. Also, the resistance of the resistors 106, 108 is typically chosen to be significantly large so that little power is dissipated in the resistors 106, 108. Thus, the complex termination modules 302, 304 do not consume as much power as the load resistance 106, 108 in the DSL line interface unit 100 of FIG. 1. On the other hand, the receive signal 114 primarily passes through the resistors 106, 108, because the capacitors 306, 308 provide high impedance to low frequency signals. That is, the receive signal 114 develops a voltage on the resistors 106, 108 with little bypassing through the capacitors 306, 308, so the loss of the receive signal 114 due to the addition of the capacitors 306, 308 is not so great. In a typical design, the complex termination modules 302, 304 may reduce up to 45% of power consumption.

The disadvantage of the complex termination scheme described in FIG. 2 is that the return loss standard is violated. Because of the complex load, the input impedance seen by the return signal 114 can no longer match that of the transmission line 114, resulting in violation of the regulatory standards on return loss. FIG. 4 is a diagram illustrating the return loss 400 for a return signal measured from a DSL modem including a complex termination scheme such as that described in FIG. 3. Referring to FIG. 4, the return loss 400 is above −10 dB over the entire frequency spectrum of the receive signal 114.

Therefore, there is a need for a DSL line interface unit that meets the return loss standards for the return signal and does not consume much output power of the transmit signal.

SUMMARY OF THE INVENTION

The present invention provides a DSL line interface including an impedance synthesizer module that provides negative feedback to the differential amplifier in the DSL line interface so that the return loss standards for the return signal are met without dissipation of much output power of the transmit signal. In one embodiment, the DSL line interface unit comprises a differential line driver including a first amplifier and a second amplifier for amplifying the DSL transmit signal, a first complex termination module coupled to an output of the first amplifier and detecting a first voltage corresponding to the DSL receive signal, a second complex termination module coupled to an output of the second amplifier and detecting a second voltage corresponding to the DSL receive signal, a transformer including a primary winding coupled to the transmission line and a secondary winding coupled to the first complex termination module and to the second complex termination module, and an impedance synthesizer module coupled between the secondary winding of the transformer and the first and second amplifiers to provide negative feedback to the first and second amplifiers.

In one embodiment, the impedance synthesizer module includes a first resistor, a second resistor, and a third resistor. The first resistor is coupled between the center taps of the secondary winding of the transformer. The second resistor is coupled between one end of the first resistor and the negative input terminal of the first amplifier. The second resistor is coupled between the other end of the first resistor and the negative input terminal of the second amplifier. The first resistor detects the voltage developed between the center taps of the secondary winding of the transformer, which is proportional to the current flowing through the secondary winding of the transformer and thus to the DSL receive signal. The voltage detected across the first resistor is fed to the negative inputs of the first and second amplifiers. In this manner, the input impedance of the DSL interface as seen by the DSL receive signal is increased, so that the return loss standards for the DSL interface is met while still achieving high efficiency by use of the first and second complex termination modules.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
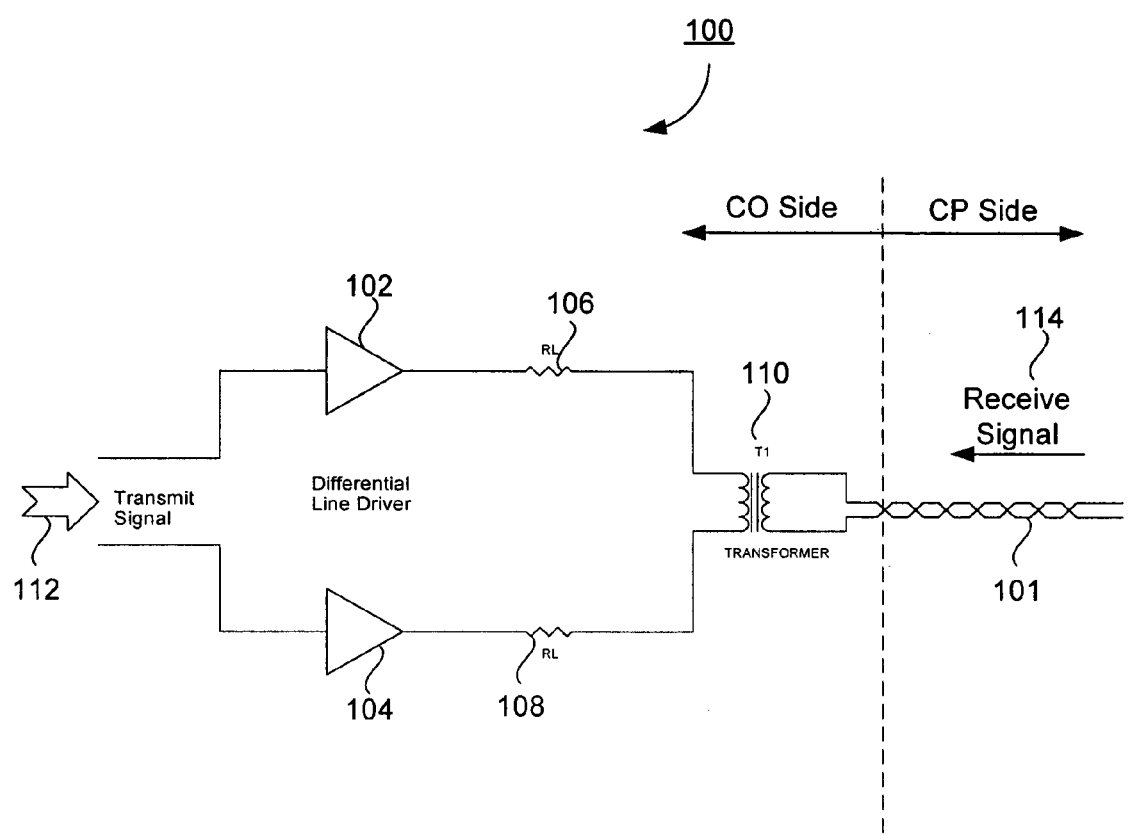
FIG. 1 is a diagram illustrating a conventional DSL line interface unit.
Figure 2:
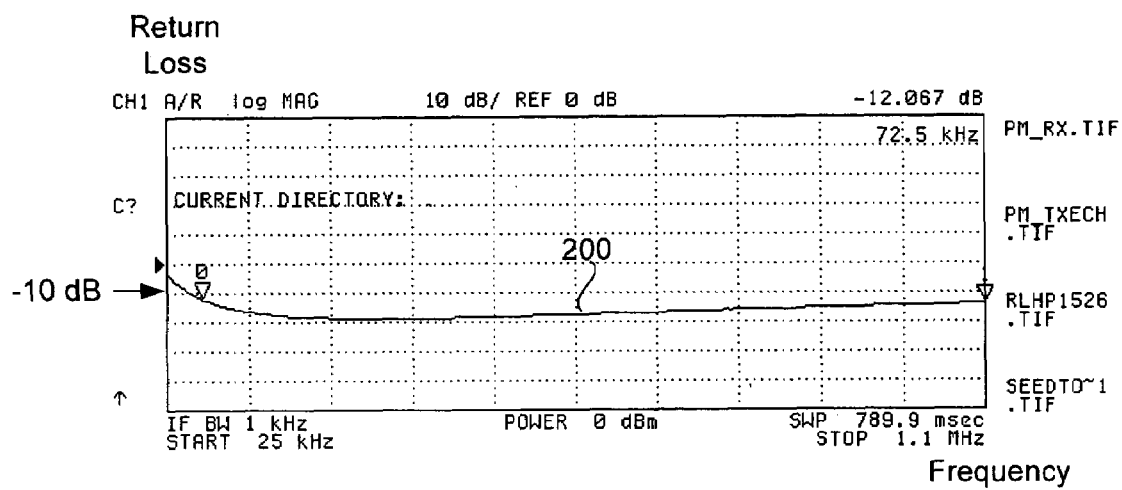
FIG. 2 is a diagram illustrating the return loss for the receipt signal in the conventional DSL line interface unit of FIG. 1.
Figure 3:
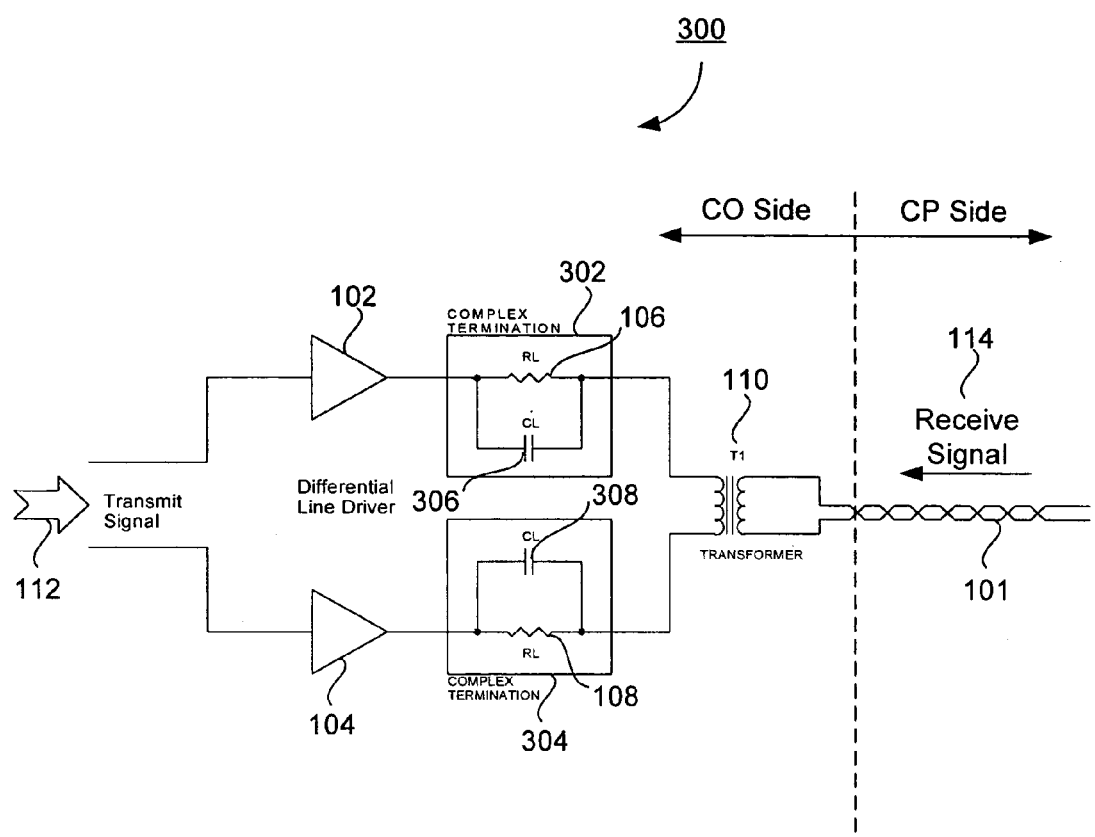
FIG. 3 is a diagram illustrating another conventional DSL line interface unit with a "complex termination" scheme.
Figure 4:
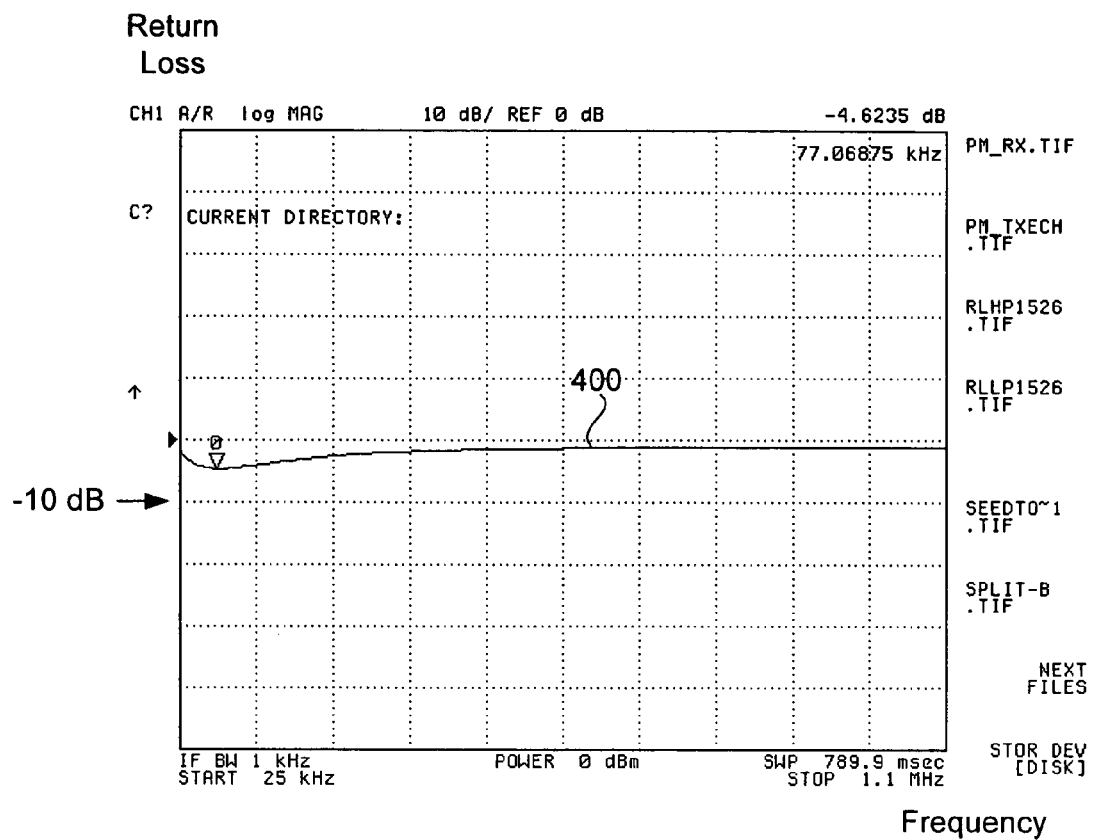
FIG. 4 is a diagram illustrating the return loss for the receipt signal measured from a DSL modem including a complex termination scheme such as that described in FIG. 3.

The embodiments of the present invention will be described below with reference to the accompanying drawings. Where possible, like reference numerals are used for like elements in the accompanying drawings.

Figure 5:
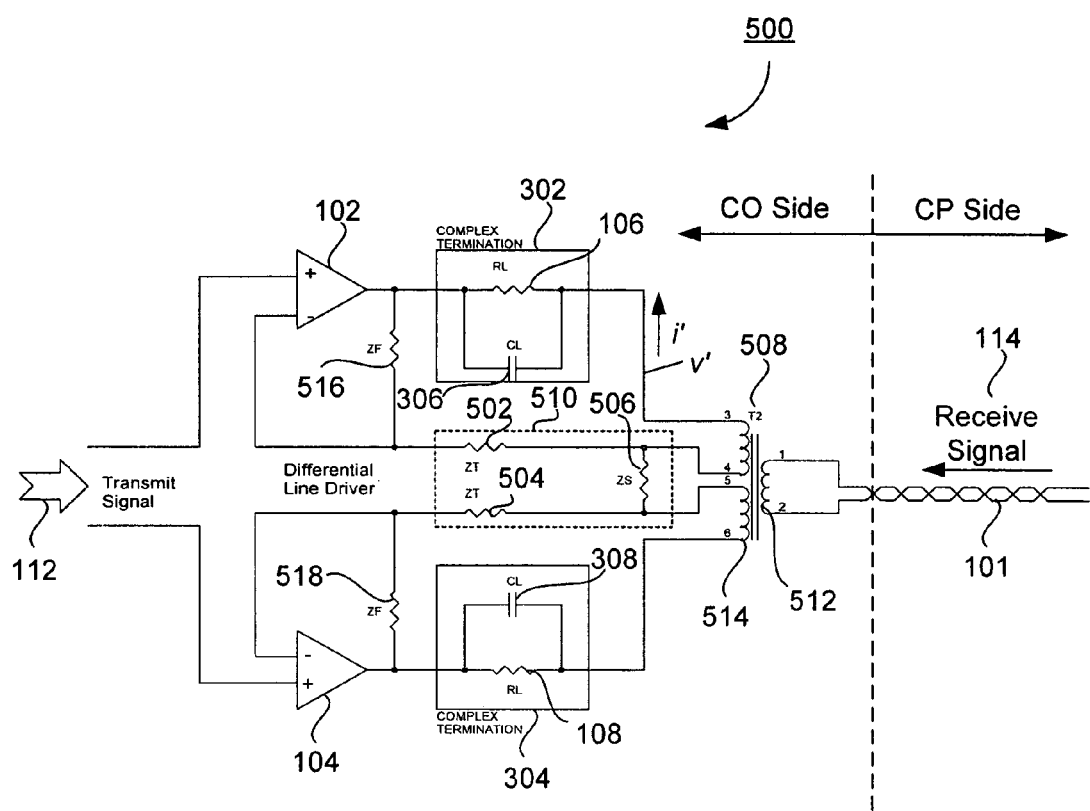
FIG. 5 is a diagram illustrating a DSL line interface unit according to one embodiment of the present invention.

FIG. 5 is a diagram illustrating a DSL line interface unit 500 according to one embodiment of the present invention. The DSL line interface unit 500 couples a DSL modem (not shown) on the CO side to the transmission line 101 on the CP side. The DSL line interface unit 500 includes a differential line driver including amplifiers 102, 104, complex termination modules 302, 304, an impedance synthesizer module 510, and a transformer (T2) 508. The complex termination module 302 includes a resistor 106 and a capacitor 306 coupled to each other in parallel, and the complex termination module 304 includes a resistor 108 and a capacitor 308 coupled to each other in parallel. The impedance synthesis module 510 includes components 502, 504, 506 that have impedances of $Z_T$, $Z_T$, and $Z_S$, respectively. For instance, the components 502, 504, 506 may be resistors in the embodiment shown in FIG. 5, although other types of passive components or active components may be used in the impedance synthesis module 510.

The differential line driver 102, 104 amplifies the transmit signal 112 from the DSL modem (not shown) on the CO side to drive the transmit signal 112 on the transmission line 101. The transformer 508 electrically isolates the CO side from the CP side so that a high voltage on either of the CO and CP sides does not destroy the other side. The transformer 508 has primary windings 512 toward the CP side and secondary windings 514, 516 toward the CO side. The secondary windings 514 are split in two separate windings. The DSL line interface unit 500 also receives a receive signal 114 from the CP side. The resistors 106, 108 develops voltages corresponding to the receive signal 114, so that the DSL line interface unit 500 may sense the receive signal 114 in the form of a voltage. The transmit signal 112 output from the differential line drivers 102, 104 is fed to the transmission line 101 via the complex termination modules 106, 108.

The impedance synthesizer module 510 is coupled between the center taps of the secondary windings 514. The impedance synthesizer module 510 samples a small portion of the transmit signal 112 on the resistor 506, and feeds the sampled signal into the negative inputs of the differential amplifiers 102, 104 through the resistors 502, 504, respectively, to provide negative feedback to the differential amplifiers 102, 104. The signal sampled by the resistor 506 is proportional to the current through the primary windings 512, which is in turn proportional to the line current provided by the receive signal 114. The resistors 502, 504 control the amount of feedback current provided to the differential amplifiers 102, 104. By controlling the line current provided by the receive signal 114 for a given input voltage provided by the receive signal 114, the input impedance for the receive signal 114 may also be controlled.

By circuit analysis and assuming that the gain of the differential amplifiers 102, 104 are high (like the gain of a typical operational amplifier (OP Amp), it can be shown that the input impedance ($Z_{in}$) for the receive signal 114 is:

$$Z_{in} \approx N^2 * Z_S (1+Z_F/Z_T),$$

where N is the turns ratio of the transformer 508 from the primary side (line side) to the secondary side (driver side) and $Z_F$ is the resistance of the resistors 516, 518 coupled to the output of the differential amplifiers 102, 104, respectively. The return loss for the return signal 114 is the lowest (minus infinity) when the input impedance seen by the receive signal 114 is matched to the line impedance of the transmission line 101. By selecting appropriate impedance values $Z_S$, $Z_F$, and $Z_T$, the input impedance for the receive signal 114 may be set such that the return loss requirement for the return signal 114 is met (i.e., less than −10 dB) even when the complex termination modules 302, 304 are present. It is noted that the input impedance $Z_{in}$ is almost irrelevant to the values of the components in the complex termination modules 302, 304, and is only affected by the impedance values $Z_S$, $Z_F$, and $Z_T$ of the components in the impedance synthesizer module 510. It can also be shown that the gain of the differential line driver 102, 104 is:

$$\text{Gain} \approx -(Z_F/Z_S)/(1+Z_F Z_S/Z_T Z_L),$$

where $Z_L$ is the impedance of the resistors 106, 108.

Qualitative analysis of the circuitry of the DSL line interface unit 500 also shows that the input impedance for the return signal 114 is increased by providing negative feedback of the transmit signal 114 to the differential amplifiers 102, 104 via the impedance synthesizer module 510. Consider a current i' entering the complex termination module 302 and a voltage v' at the output of the complex termination module 302. If the voltage v' increases, the impedance synthesizer module 510 senses a decrease in the voltage sensed between the center taps of the secondary windings 514, 516. Thus, the output voltage and the output current at the output of the differential amplifier 102 increase in response to the increase in the voltage v'. Since the output current of the differential amplifier 102 is in opposite direction to the current i' entering the complex termination module 302, the current i' decreases in response to the increase in the voltage v'. This indicates that the input impedance seen by the receipt signal 114 has increased by providing negative feedback of the transmit signal 114 to the differential amplifiers 102, 104 via the impedance synthesizer module 510, even when the complex termination modules 302, 304 are present.

Figure 6:
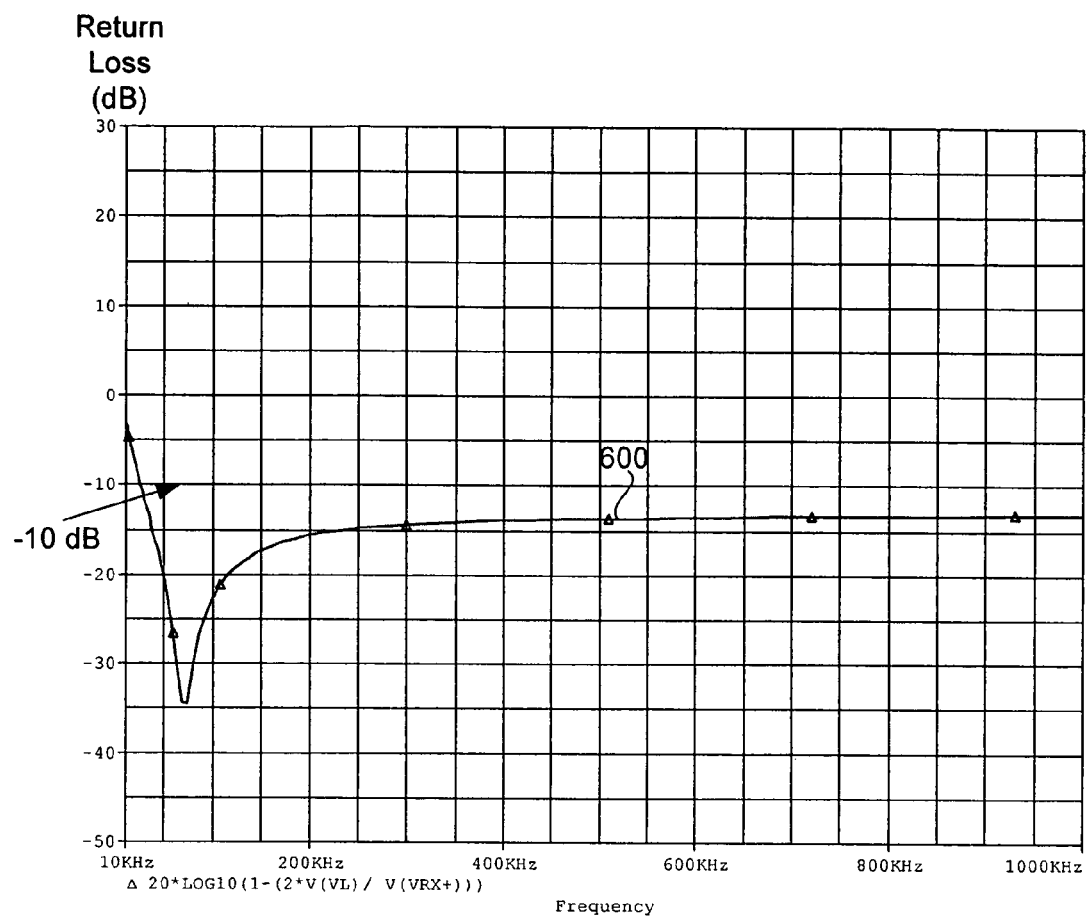
FIG. 6 is a diagram illustrating the return loss for the receive signal measured from the DSL line interface unit of FIG. 5 according to one embodiment of the present invention.

FIG. 6 is a diagram illustrating the return loss 600 for the receive signal 114 measured from the DSL line interface unit 500 of FIG. 5 according to one embodiment of the present invention. The return loss 600 was measured with component values $Z_S$ (impedance of resistor 506) of 2 ohm, $Z_T$ (impedances of resistors 516, 518) of 392 ohm, $Z_F$ (impedances of resistors 516, 518) of 7870 ohm, and N (turns ratio of transformer 508) of 1.2. The return loss 600 is lower than the return loss standard of −10 dB in many countries over practically all frequencies of the return signal 114.

The present invention has the advantage that the DSL line interface unit of the present invention can meet the return loss standards (less than −10 dB) for the return signal but still does not consume much output power of the transmit signal 112 of the DSL line interface unit 500. The negative feedback of the transmit signal 114 to the differential amplifiers 102, 104 provided by the impedance synthesizer module 510 increases the input impedance seen by the receipt signal 114 to match the line impedance of the transmission line 101. The impedance synthesizer module 510 may be added without significant cost or volume.

Although the present invention has been described above with respect to several embodiments, various modifications can be made within the scope of the present invention. For example, although resistors are used in the impedance synthesizer module 510 in the embodiment of FIG. 5, more complex impedance such as capacitors or inductors may also be used for $Z_S$, $Z_F$ and $Z_T$ to obtain the desired complex impedance $Z_{in}$ for the receive signal 114 and the desired frequency response for the gain of the differential line driver 102, 104. The impedance synthesizer module 510 may be used with any type of complex termination modules 302, 304, such as L-C complex terminations as well as R-C complex terminations. The impedance synthesizer module 510 may also be used with different configurations of the differential line driver 102, 104, other than that described in the embodiment of FIG. 5.

Accordingly, the disclosure of the present invention is intended to be illustrative, but not limiting, of the scope of the invention, which is set forth in the following claims.

What is claimed is:

1. A DSL line interface unit for transmitting a DSL transmit signal to a transmission line and for receiving a DSL receive signal from the transmission line, the DSL line interface unit comprising:

a differential line driver including a first amplifier, a second amplifier, a first resistor and a second resistor, the first amplifier including a first positive input terminal and a first negative input terminal and the second amplifier including a second positive input terminal and a second negative input terminal, the first resistor coupled between an output of the first amplifier and the first negative input terminal and the second resistor coupled between an output of the second amplifier and the second negative input terminal;

a first complex termination module including a third resistor and a first capacitor coupled to the third resistor in parallel, the third resistor and the first capacitor being coupled to the output of the first amplifier, a second complex termination module including a fourth resistor and a second capacitor coupled to the fourth resistor in parallel, the fourth resistor and the second capacitor coupled to the output of the second amplifier;

a transformer including a primary winding coupled to the transmission line and a secondary winding having a first winding end coupled to the third resistor and the first capacitor and a second winding end coupled to the fourth resistor and the second capacitor; and an impedance synthesizer module including a fifth resistor, a sixth resistor, a seventh resistor, a fifth resistor being coupled between center taps of the secondary winding of the transformer and having a first end and a second end, the sixth resistor coupled between the first end of the fifth resistor and the first negative input terminal of the first amplifier, and the seventh resistor coupled between the second end of the fifth resistor and the second negative input terminal of the second amplifier, the fifth resistor detecting a voltage between the center taps of the secondary winding of the transformer and providing negative feedback to the first amplifier and the second amplifier via the sixth resistor and the seventh resistor, respectively.

2. A DSL line interface unit for transmitting a DSL transmit signal to a transmission line and for receiving a DSL receive signal from the transmission line, the DSL line interface unit comprising:

a differential line driver including a first amplifier, a second amplifier, a first resistor and a second resistor, the first amplifier including a first positive input terminal and a first negative input terminal and the second amplifier including a second positive input terminal and a second negative input terminal, the first resistor coupled between an output of the first amplifier and the first negative input terminal and the second resistor coupled between an output of the second amplifier and the second negative input terminal;

a first complex termination module including a first inductor and a first capacitor coupled in parallel to one another at the output of the first amplifier;

a second complex termination module including a second inductor and a second capacitor coupled in parallel to one another at the output of the second amplifier;

a transformer including a primary winding coupled to the transmission line and a secondary winding having a first winding end coupled to the first inductor and the first capacitor and a second winding end coupled to the second inductor and the second capacitor; and an impedance synthesizer module including a fifth resistor, a sixth resistor, a seventh resistor, a fifth resistor being coupled between center taps of the secondary winding of the transformer and having a first end and a second end, the sixth resistor coupled between the first end of the fifth resistor and the first negative input terminal of the first amplifier, and the seventh resistor coupled between the second end of the fifth resistor and the second negative input terminal of the second amplifier, the fifth resistor detecting a voltage between the center taps of the secondary winding of the transformer and providing negative feedback to the first amplifier and the second amplifier via the sixth resistor and the seventh resistor, respectively.

* * * * *